United States Patent
Jiang

(10) Patent No.: US 12,326,648 B2
(45) Date of Patent: Jun. 10, 2025

(54) CAMERA DEVICE

(71) Applicant: Chicony Electronics Co., Ltd., New Taipei (TW)

(72) Inventor: Yi-Sing Jiang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 38 days.

(21) Appl. No.: 18/457,397

(22) Filed: Aug. 29, 2023

(65) Prior Publication Data

US 2024/0272524 A1    Aug. 15, 2024

(30) Foreign Application Priority Data

Feb. 14, 2023 (TW) ................................. 112105239

(51) Int. Cl.
  *G03B 17/02* (2021.01)
  *G03B 11/04* (2021.01)
  *G03B 17/56* (2021.01)

(52) U.S. Cl.
  CPC .............. *G03B 17/02* (2013.01); *G03B 11/04* (2013.01); *G03B 17/561* (2013.01); *G03B 17/565* (2013.01)

(58) Field of Classification Search
  CPC .... G03B 17/561; G03B 11/04; G03B 17/565; G03B 17/02
  See application file for complete search history.

(56) References Cited

U.S. PATENT DOCUMENTS

2015/0029337 A1* 1/2015 Uchiyama ................ H01R 4/06
                                                              348/148

FOREIGN PATENT DOCUMENTS

JP       2007028430 A  *  2/2007
KR       100815532 B1  *  9/2006

* cited by examiner

*Primary Examiner* — Minh Q Phan
(74) *Attorney, Agent, or Firm* — Muncy, Geissler, Olds & Lowe, P.C.

(57) ABSTRACT

A camera device includes a housing, a camera module, and a light-transmitting cover plate. The housing includes a shell plate, and the shell plate has a groove. The cross-section of the groove includes an outer opening, an inner opening, and a conical connection wall. A size of the outer opening is greater than a size of the inner opening, and the conical connection wall is connected between the outer opening and the inner opening. The camera module is disposed inside the housing, the camera module includes a camera lens, and the camera lens is in the inner opening. The light-transmitting cover plate is disposed on a surface of the shell plate and covers the outer opening of the groove. The conical connection wall of the groove has a wall surface facing the light-transmitting cover plate, and a stopping member is between the wall surface and the light-transmitting cover plate.

16 Claims, 15 Drawing Sheets

CAMERA DEVICE

CROSS-REFERENCE TO RELATED APPLICATION

This non-provisional application claims priority under 35 U.S.C. § 119(a) to patent application Ser. No. 11/210,5239 filed in Taiwan, R.O.C. on Feb. 14, 2023, the entire contents of which are hereby incorporated by reference.

BACKGROUND

Technical Field

The instant disclosure relates to an optical device, in particular, to a camera device.

Related Art

Along with developments of technology, camera devices are widely used in different fields, such as personal electronic products, automobiles, and medical sciences. For example, a camera device may be installed on the car to capture the image outside the car for driving assistance. Alternatively, a camera device may be installed on a personal computer to support the functions of video recording, on-line meeting, facial recognition or the like.

SUMMARY

In general, for a camera device known to the inventor, a transparent protection cover is covered outside the camera lens of the camera device to prevent the camera lens from contacting external dusts or foreign matters. However, when the transparent protection cover is subjected to an external force (for example, when the transparent protection cover is impacted or squeezed), the transparent protection cover is prone to deformed and thus contacts or impacts the camera lens. As a result, the situation that camera lens is worn or broken happens.

In view of this, in one embodiment, a camera device is provided. The camera device comprises a housing, a camera module, and a light-transmitting cover plate. The housing comprises shell plate, and the shell plate has a groove. The cross-section of the groove comprises an outer opening, an inner opening, and a conical connection wall, a size of the outer opening is greater than a size of the inner opening, and the conical connection wall is connected between the outer opening and the inner opening. The camera module is disposed inside the housing, the camera module comprises a camera lens, and the camera lens is in the inner opening. The light-transmitting cover plate is disposed on a surface of the shell plate and covers the outer opening of the groove. The conical connection wall of the groove has a wall surface facing the light-transmitting cover plate, and a stopping member is between the wall surface and the light-transmitting cover plate.

As above, according to the camera device of one or some embodiments of the instant disclosure, the stopping member is between the wall surface of the conical connection wall and the light-transmitting cover plate. Therefore, when the light-transmitting cover plate is subjected to a force (for example, when the light-transmitting cover plate is impacted or squeezed by an external force), the stopping member can achieve the function of supporting the light-transmitting cover plate to prevent the deformation of the light-transmitting cover plate or to greatly reduce the deformation extent of the light-transmitting cover plate, thereby effectively preventing the light-transmitting cover plate from contacting or impacting the camera lens in the groove.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
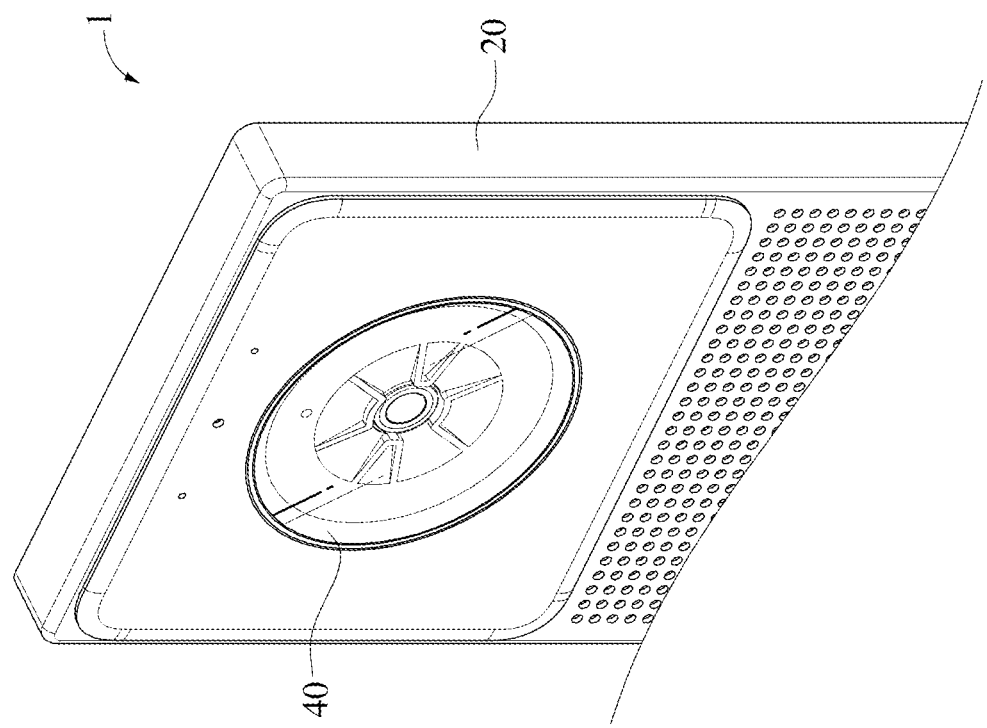
FIG. 1 illustrates a perspective view of a camera device according to a first embodiment of the instant disclosure.

It is noted that, in the embodiments, the terms "first" and "second" are provided to describe different elements, and the elements are not thus limited by using these terms. Furthermore, for the sake of convenience and clarity in the description, thicknesses or sizes of the elements in the drawings illustrated in an exaggerated, omitted, or general manner are used to help a person skilled in the art with comprehension and reading, and the sizes of the elements are not completely the actual sizes and are not intended to limit any restraint conditions under which the instant disclosure can be implemented and therefore have no technical significance. Any modification to the structures, change to the proportional relationships, or adjustment on the sizes without affecting the effects and the objectives that can be achieved according to the instant disclosure should fall within the scope of the technical content disclosed by the instant disclosure. In all the figures, identical symbols are used to denote identical or similar elements.

Figure 2:
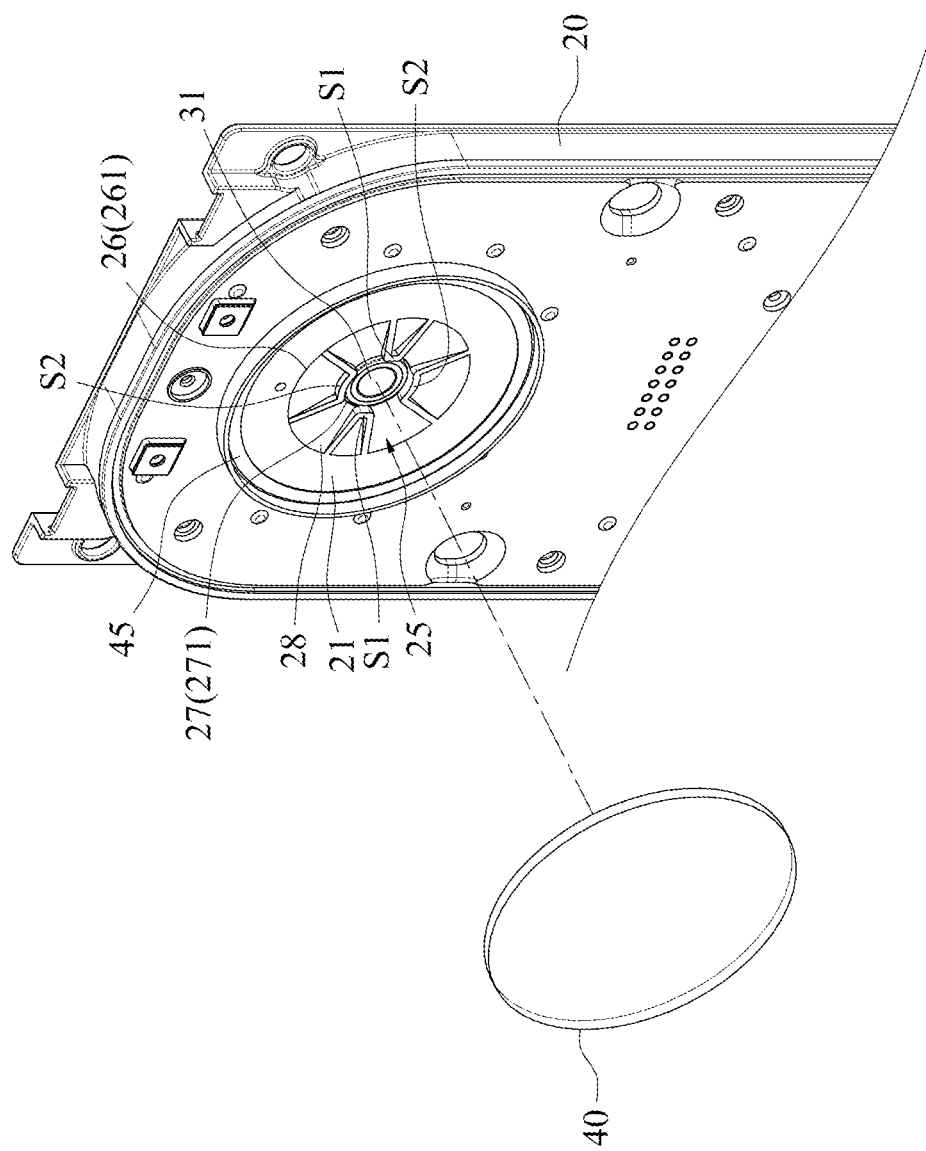
FIG. 2 illustrates an exploded view of the camera device of the first embodiment of the instant disclosure.
Figure 3:
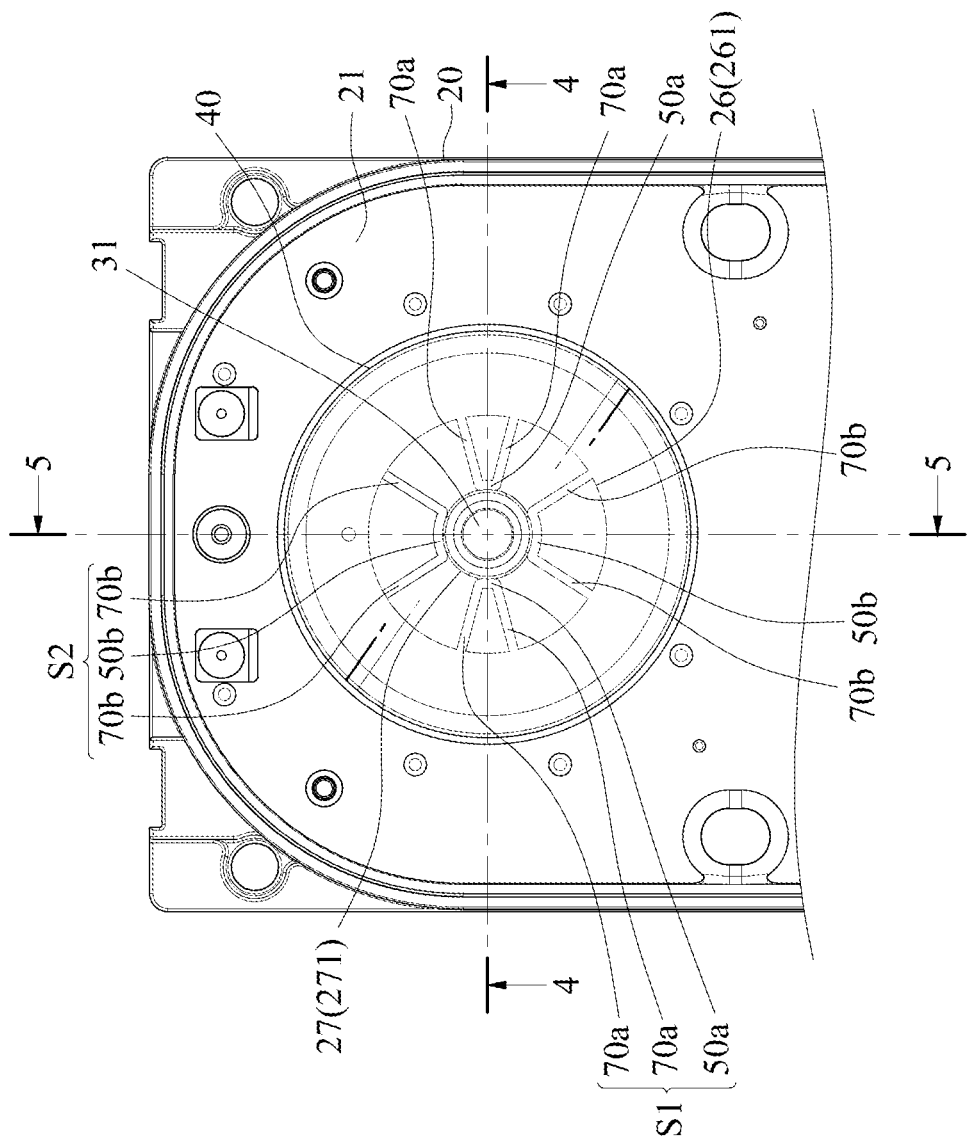
FIG. 3 illustrates a plan view of the camera device of the first embodiment of the instant disclosure.
Figure 4:
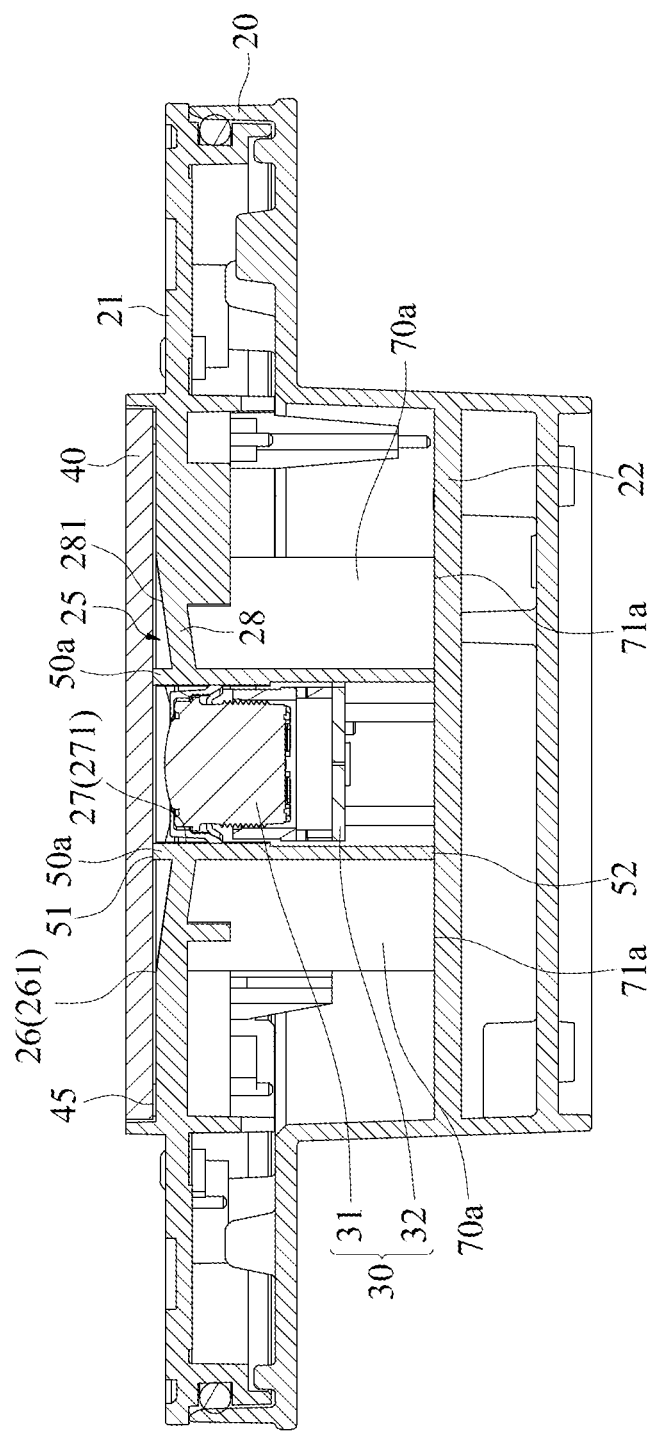
FIG. 4 illustrates a cross-sectional view along line 4-4 shown in FIG. 3.
Figure 5:
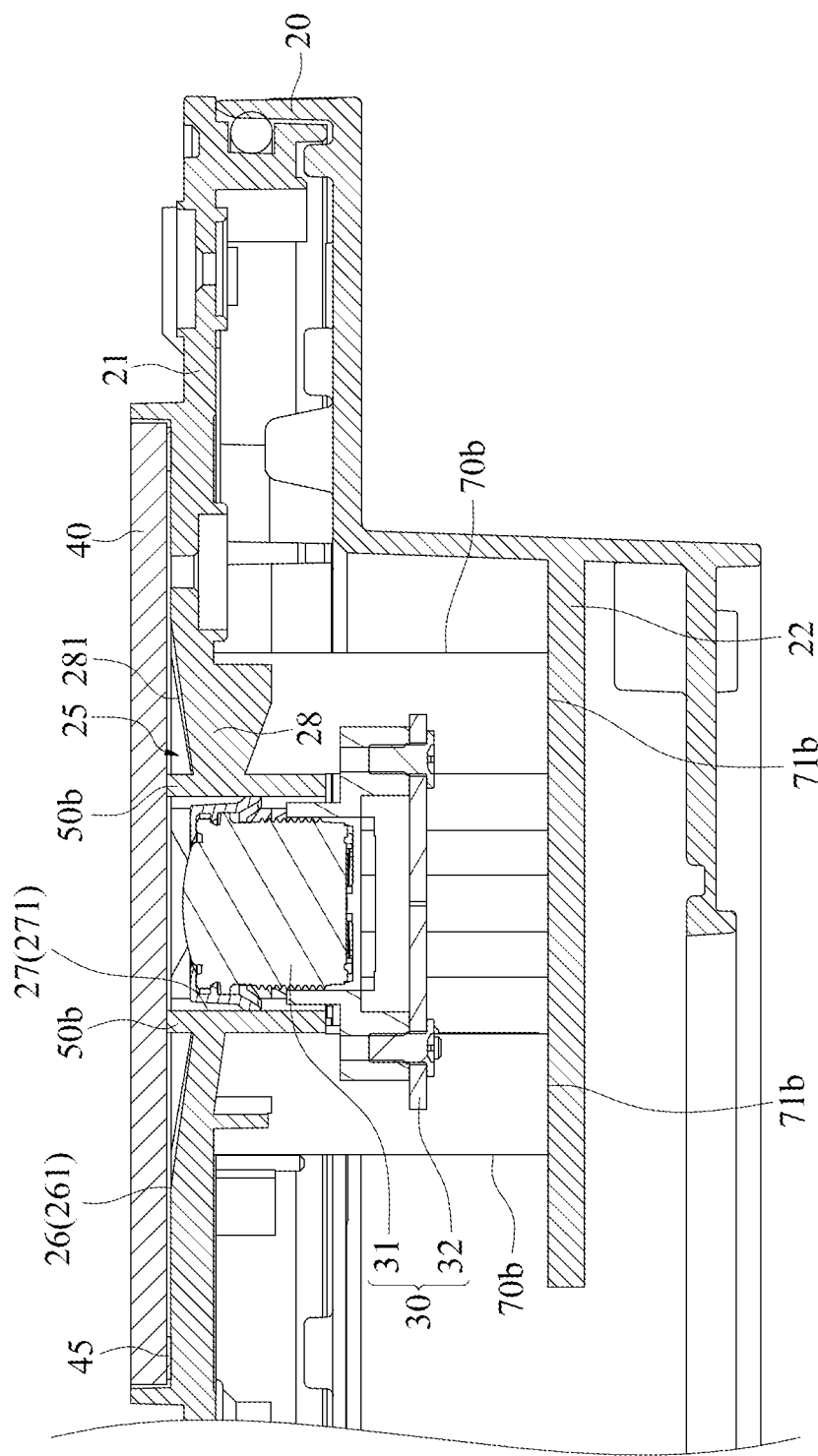
FIG. 5 illustrates a cross-sectional view along line 5-5 shown in FIG. 3.

FIG. 1 illustrates a perspective view of a camera device according to a first embodiment of the instant disclosure. FIG. 2 illustrates an exploded view of the camera device of the first embodiment of the instant disclosure. FIG. 3 illustrates a plan view of the camera device of the first embodiment of the instant disclosure. FIG. 4 illustrates a cross-sectional view along line 4-4 shown in FIG. 3. FIG. 5 illustrates a cross-sectional view along line 5-5 shown in FIG. 3. As shown in FIG. 1 to FIG. 5, in this embodiment, the camera device 1 comprises a housing 20, a camera module 30, and a light-transmitting cover plate 40. In some embodiments, the camera device 1 may be utilized in different electronic devices for capturing images around the electronic devices. For example, the camera device 1 may be utilized in automotive products (e.g., dashcams, backup camera systems, or surrounding view systems), mobile devices (e.g., smart phones, tablet computers, or notebook computers), cameras, or other electronic devices.

As shown in FIG. 2 to FIG. 5, the housing 20 is hollowed and has a shell plate 21. The shell plate 21 has a groove 25. A cross-section (as shown in FIG. 4) of the groove 25 comprises an outer opening 26, an inner opening 27, and a conical connection wall 28. The inner opening 27 is at a bottom portion of the groove 25, a size of the outer opening 26 is greater than a size of the inner opening 27, and the conical connection wall 28 is connected between the outer opening 26 and the inner opening 27. In this embodiment, both the outer opening 26 and the inner opening 27 are round openings, and the diameter of the outer opening 26 is greater than the diameter of the inner opening 27. Therefore, in this embodiment, the width of the conical connection wall 28 gradually reduced along a direction from the outer opening 26 toward the inner opening 27.

In some embodiments, the outer opening 26 and the inner opening 27 may be openings with different shapes. For example, the outer opening 26 may be a rectangular opening, a square opening, or an elliptical opening, and the inner opening 27 is a round opening.

As shown in FIG. 2 to FIG. 5, the camera module 30 is disposed inside the housing 20. The camera module 30 comprises a camera lens 31 and a circuit board 32, and the circuit board 32 is fixed inside the housing 20. For example, the circuit board 32 may be fixed inside the housing 20 through adhering, soldering, engaging, locking, or other manners. The camera lens 31 is electrically connected to the circuit board 32 and is in the inner opening 27. Therefore, the external light can enter the groove 25 through the outer opening 26 so as to be transmitted to the camera lens 31, and the camera lens 31 can sense and obtain an image.

As shown in FIG. 2 to FIG. 5, the light-transmitting cover plate 40 may be a transparent or a semi-transparent cover plate made of polycarbonate (PC), Polymethylmethacrylate (PMMA), or glass, and the light-transmitting cover plate 40 is disposed on the surface of the shell plate 21 and covers the outer opening 26 of the groove 25. That is, in this embodiment, as compared with the inner opening 27, the outer opening 26 is nearer to the light-transmitting cover plate 40 (in other words, in this embodiment, the distance between the outer opening 26 and the light-transmitting cover plate 40 is less than the distance between the inner opening 27 and the light-transmitting cover plate 40). Therefore, external dusts, moisture, or other foreign matters can be prevented from entering the groove 25, and thus the camera lens 31 can be protected, while the external light can still pass through the light-transmitting cover plate 40 so as to be transmitted to camera lens 31. In some embodiments, the light-transmitting cover plate 40 may be fixed on the surface of the shell plate 21 through adhering, engaging, locking, or other manners.

As shown in FIG. 2 to FIG. 5, the conical connection wall 28 of the groove 25 of the shell plate 21 has a wall surface 281. The wall surface 281 is a surface of the conical connection wall 28 facing the light-transmitting cover plate 40, and at least one stopping member S1 is between the wall surface 281 and the light-transmitting cover plate 40. Therefore, when the light-transmitting cover plate 40 is subjected to a force (for example, when the light-transmitting cover plate 40 is impacted or squeezed by an external force), the stopping member(s) S1 can achieve the function of supporting the light-transmitting cover plate 40 to prevent the deformation of the light-transmitting cover plate 40 or to greatly reduce the deformation extent of the light-transmitting cover plate 40, thereby effectively preventing the light-transmitting cover plate 40 from contacting or impacting the camera lens 31 in the groove 25.

In some embodiments, the number, the shape, or the structure of the stopping member S1 can be adjusted and designed depending on the actual product demands. In the following, different embodiments for the stopping member S1 are provided with the aids of the drawings.

As shown in FIG. 2 to FIG. 5, in the first embodiment, a plurality of stopping members S1, S2 is arranged between the wall surface 281 of the conical connection wall 28 and the light-transmitting cover plate 40, the stopping members S1, S2 are integrally connected to the conical connection wall 28, the number of the stopping members S1, S2 are four, and the stopping members S1, S2 surround the inner opening 27. Each of the stopping members S1 comprises an inner side protruding rib 50a, likewise, each of the stopping members S2 comprises an inner side protruding rib 50b, and each of the inner side protruding ribs 50a, 50b extend from the wall surface 281 of the conical connection wall 28 toward the light-transmitting cover plate 40. Moreover, in this embodiment, the inner side protruding ribs 50a, 50b surrounds the inner opening 27, and the inner side protruding ribs 50a, 50b are spaced from each other and are not connected with each other. Therefore, the external light can be transmitted to the camera lens 31 in the inner opening 27 through the spaces between the inner side protruding ribs 50a, 50b.

As shown in FIG. 2 to FIG. 5, one of two ends of each of the stopping members S1, S2 is adjacent to the light-transmitting cover plate 40. For example, in this embodiment, an end portion of the inner side protruding rib 50a/50b of each of the stopping members S1/S2 may directly lean against the surface of the light-transmitting cover plate 40 to provide a better supporting effect, thereby preventing the deformation of the light-transmitting cover plate 40 upon the light-transmitting cover plate 40 is subjected to a force. In other embodiments, a small gap (for example, a tolerance gap) may be between the end portion of each of the inner side protruding ribs 50a/50b and the surface of the light-transmitting cover plate 40. Therefore, when the light-transmitting cover plate 40 is subjected to a force, the inner side protruding ribs 50a, 50b can still support the light-transmitting cover plate 40 instantly.

As shown in FIG. 2 to FIG. 5, in this embodiment, the outer opening 26 has a first periphery 261, the inner opening 27 has a second periphery 271, and the first periphery 261 and the second periphery 271 may respectively be a round periphery (as illustrated in FIG. 2), a rectangular periphery, an elliptical periphery, or peripheries with other shapes. The inner side protruding ribs 50a, 50b of the stopping members S1, S2 are respectively between the first periphery 261 and the second periphery 271, and as compared with the first periphery 261, the inner side protruding robs 50a, 50b are nearer to the second periphery 271 (in other words, in this embodiment, the distance between the inner side protruding ribs 50a, 50b and the first periphery 261 is less than the distance between the inner side protruding ribs 50*a*, 50*b* and the second periphery 271). In this embodiment, the inner side protruding ribs 50*a*, 50*b* surround the second periphery 271. Therefore, the inner side protruding ribs 50*a*, 50*b* can be arranged much closer to the central regions of the camera lens 31 and the light-transmitting cover plate 40, and the distance between the inner side protruding ribs 50*a*, 50*b* can be arranged shorter, thereby further preventing the deformation of the light-transmitting cover plate 40 upon the light-transmitting cover plate 40 is subjected to a force.

Further, as shown in FIG. 2 to FIG. 5, in this embodiment, each of the inner side protruding ribs 50*a*, 50*b* is an arced structure, and the shape of each of the inner side protruding ribs 50*a*, 50*b* corresponds to the shape of the periphery of the inner opening 27. Moreover, the two inner side protruding ribs 50*a* are at two opposite sides (for example, the left side and the right side) of the second periphery 271 of the inner opening 27 and the camera lens 31, and the width of each of the inner side protruding ribs 50*a* is less than the width of each of the inner side protruding ribs 50*b*, so that the configuration of the camera device 1 can correspond to the camera angle of the camera lens 31. In general, for the image ratio captured by the camera lens 31, usually the length is greater than the width; for example, the length-to-width ratio of the image is 4:3, 3:2, or 16:9. Therefore, by reducing the widths of the two inner side protruding ribs 50*a* at the two opposite sides of the camera lens 31, the camera device 1 can correspond to the common camera angle of the camera lens 31. Furthermore, under such configuration, the light coming from the two opposite sides of the camera lens 31 can be prevented from being blocked by the two inner side protruding ribs 50*a*, thereby retaining the image quality of the image captured by the camera lens 31.

As shown in FIG. 2 to FIG. 5, in this embodiment, each of the stopping members S1 further comprises at least one radial protruding rib 70*a* (in this embodiment, a plurality of radial protruding ribs 70*a*), and each of the stopping members S2 further comprises at least one radial protruding rib 70*b* (in this embodiment, a plurality of radial protruding ribs 70*b*). Therefore, when the light-transmitting cover plate 40 is subjected to a force (for example, when the light-transmitting cover plate 40 is impacted or squeezed by an external force), the radial protruding ribs 70*a*, 70*b* can support the light-transmitting cover plate 40 at the same time. Two radial protruding ribs 70*a* are connected between the inner side protruding rib 50*a* of each of the stopping members S1 and the first periphery 261 of the outer opening 26, and two radial protruding ribs 70*b* are connected between the inner side protruding rib 50*b* of each of the stopping members S2 and the first periphery 261. The radial protruding ribs 70*a*, 70*b*, the inner side protruding ribs 50*a*, 50*b*, and the shell plate 21 may be integrally formed as a one-piece structure. As shown in FIG. 3, taking one of the radial protruding ribs 70*a* as an example, one of two sides of the radial protruding rib 70*a* is adjacent to the first periphery 261 of the outer opening 26, and the other side of the radial protruding rib 70*a* is connected to the inner side protruding rib 50*a* and is adjacent to the second periphery 271 of the inner opening 27. Therefore, the overall structural strength of each of the stopping members S1 can be enhanced through the radial protruding rib 70*a*, so that the deformation of each of the stopping members S1 can be prevented upon the stopping members S1 are subjected to a force, thus allowing the stopping members S1 providing a better supporting effect.

As shown in FIG. 4 and FIG. 5, the other end of each of the stopping members S1, S2 may extend into the housing 20. For example, in this embodiment, an end portion of the inner side protruding rib 50*a*/50*b* of each of the stopping members S1/S2 further extends into the housing 20 to increase the length of each of the inner side protruding ribs 50*a*, 50*b*, so that the structural strength of each of the inner side protruding ribs 50*a*, 50*b* can be enhanced, thus allowing each of the inner side protruding ribs 50*a*, 50*b* providing a better supporting effect. As shown in FIG. 4, taking one of the stopping members S1 as an example, the inner side protruding rib 50*a* of the stopping member S1 has a first end 51 and a second end 52 opposite to the first end 51. The first end 51 is adjacent to the light-transmitting cover plate 40, and the second end 52 extends into the housing 20, so that the structural strength of each of the inner side protruding ribs 50*a*, 50*b* can be enhanced, thus allowing each of the inner side protruding ribs 50*a*, 50*b* providing a better supporting effect. Moreover, the end portion 71*a*, 71*b* of each of the radial protruding ribs 70*a*, 70*b* may extend into the housing 20 to increase the length of each of the radial protruding ribs 70*a*, 70*b*, so that the structural strength of each of the radial protruding ribs 70*a*, 70*b* can be enhanced, thus allowing each of the radial protruding ribs 70*a*, 70*b* providing a better supporting effect.

As shown in FIG. 4 and FIG. 5, at least one fixation member 22 is in the housing 20. For example, the fixation member 22 may be a plate or a block fixed inside the housing 20. In this embodiment, the fixation member 22 is a plate inside the housing 20, and the fixation member 22 is integrally connected to the housing 20, thereby further enhancing the structural strength of the fixation member 22. The second end 52 of inner side protruding rib 50*a* in the housing 20 and the end portion 71*a*, 71*b* of each of the radial protruding ribs 70*a*, 70*b* further lean against the fixation member 22, thereby further enhancing the supporting effect of the inner side protruding ribs 50*a*, 50*b* and the radial protruding ribs 70*a*, 70*b*. Therefore, the deformation of each of the inner side protruding ribs 50*a*, 50*b* and the deformation of each of the radial protruding ribs 70*a*, 70*b* can be prevented upon each of the inner side protruding ribs 50*a*, 50*b* and each of the radial protruding ribs 70*a*, 70*b* are subjected to a force.

Figure 6:
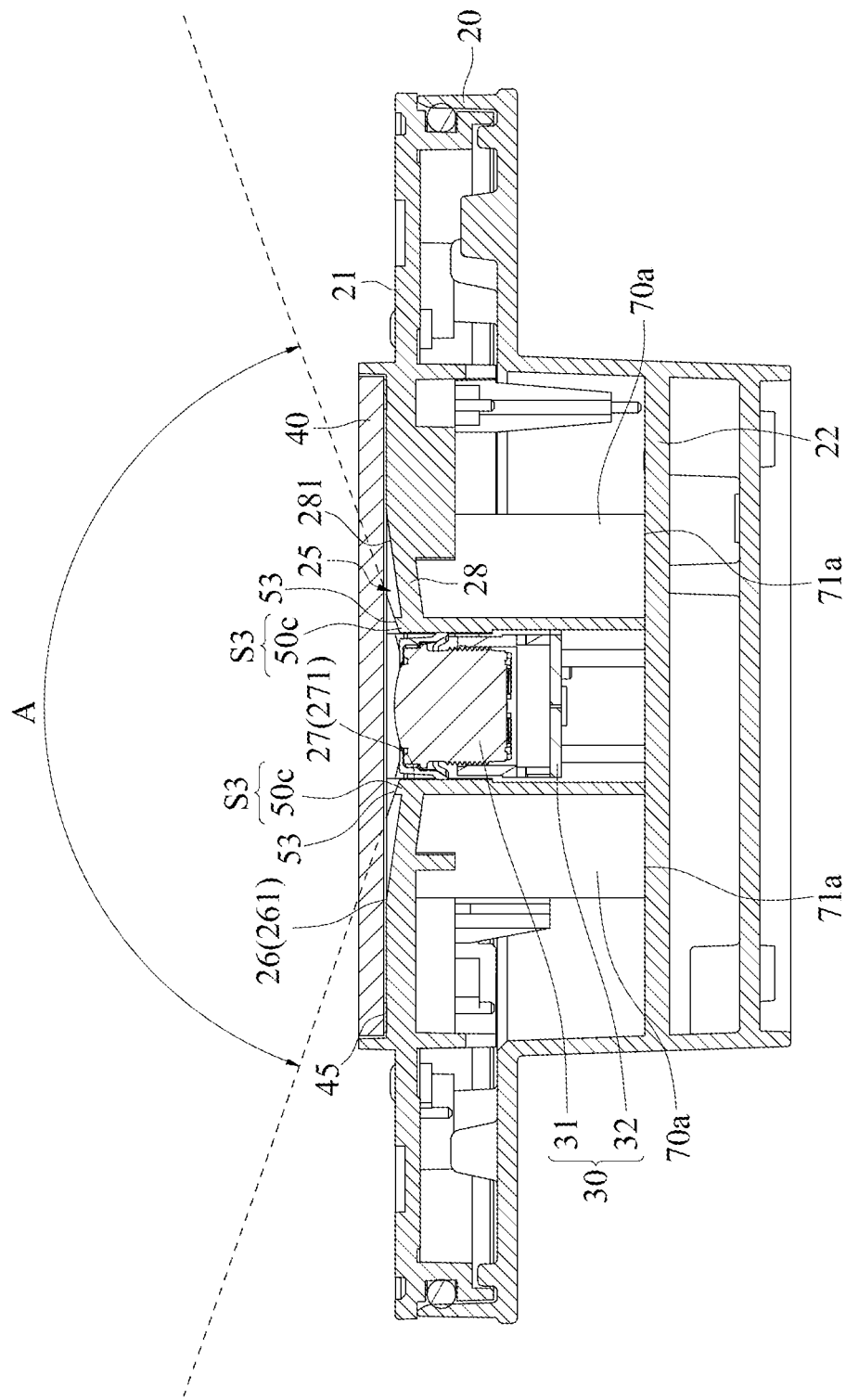
FIG. 6 illustrates a cross-sectional view of a camera device according to a second embodiment of the instant disclosure.

FIG. 6 illustrates a cross-sectional view of a camera device according to a second embodiment of the instant disclosure. As shown in FIG. 6, the difference between this embodiment and the first embodiment shown in FIG. 4 is at least that the shape of the stopping member. Specifically, comparing the inner side protruding rib 50*c* of each of the stopping members S3 of this embodiment with the inner side protruding rib 50*a* of each of the stopping members S1 of the first embodiment, in this embodiment, an end portion of the inner side protruding rib 50*c* of each of the stopping members S3 adjacent to the light-transmitting cover plate 40 has an inclination surface 53. Therefore, through the configuration of the inclination surface 53, more external lights can be transmitted to the camera lens 31, thereby increasing the range of the camera angle of the camera lens 31. For example, as shown in FIG. 6, assuming that the camera lens 31 has a field-of-view angle A, the angle between the two inclination surfaces 53 of the two stopping members S3 may be equal to the field-of-view angle A, so that the external light can be prevented from being blocked by the stopping members S3 to affect the capturing quality of the camera lens 31.

Figure 7:
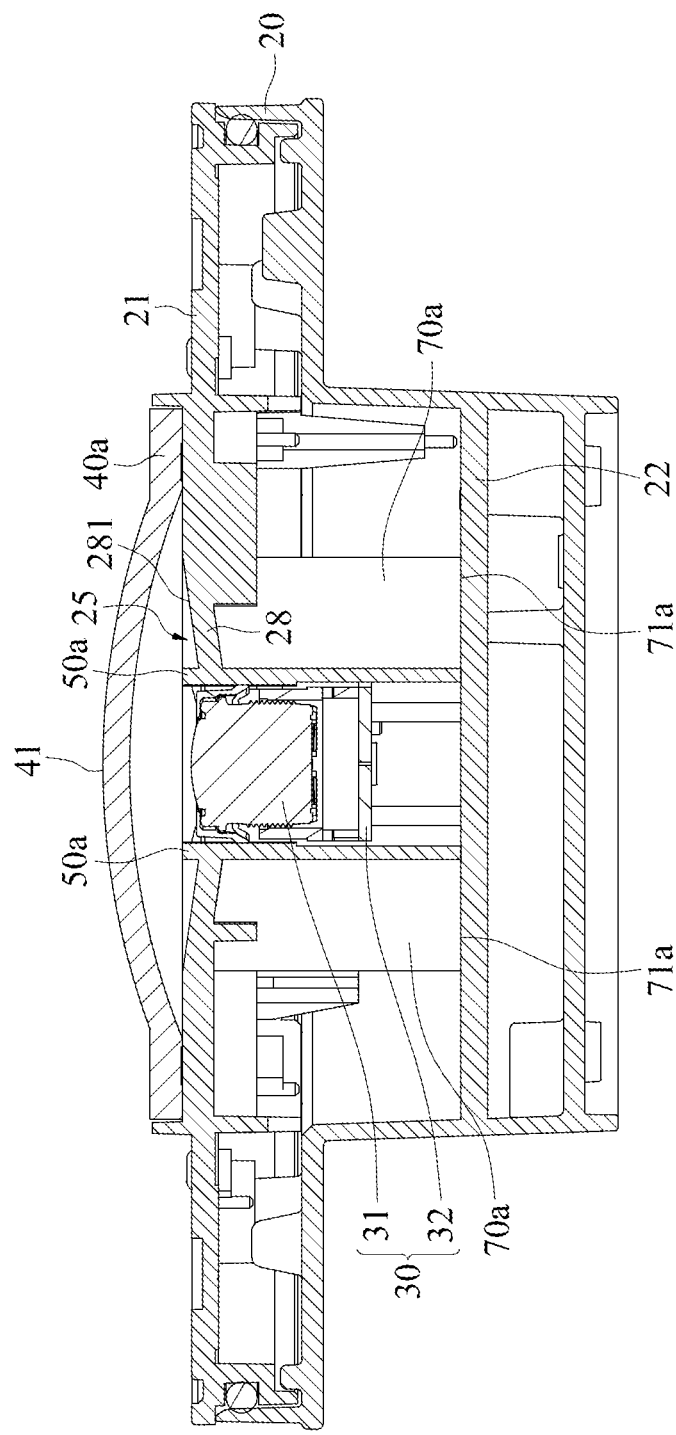
FIG. 7 illustrates a cross-sectional view of a camera device according to a third embodiment of the instant disclosure.

FIG. 7 illustrates a cross-sectional view of a camera device according to a third embodiment of the instant disclosure. As shown in FIG. 7, the difference between this embodiment and the first embodiment shown in FIG. 4 is at least that the shape of the light-transmitting cover plate. Specifically, comparing the light-transmitting cover plate 40a in this embodiment with the light-transmitting cover plate 40 in the first embodiment, in this embodiment, the light-transmitting cover plate 40a further has a protrusion 41, the protrusion 41 protrudes toward a direction away from the housing 20, and a position of the protrusion 41 corresponds to a position of the groove 25 and a position of the camera lens 31. For example, a central portion of the protrusion 41 corresponds to a central portion of the camera lens 31. Therefore, the protrusion 41 of the light-transmitting cover plate 40a can be kept farer from the camera lens 31, and the structural strength of the light-transmitting cover plate 40a can be enhanced. Hence, when the light-transmitting cover plate 40a is subjected to a force, the light-transmitting cover plate 40a can be further effectively prevented from contacting or impacting the camera lens 31 in the groove 25 caused by the deformation of the light-transmitting cover plate 40a.

Figure 8:
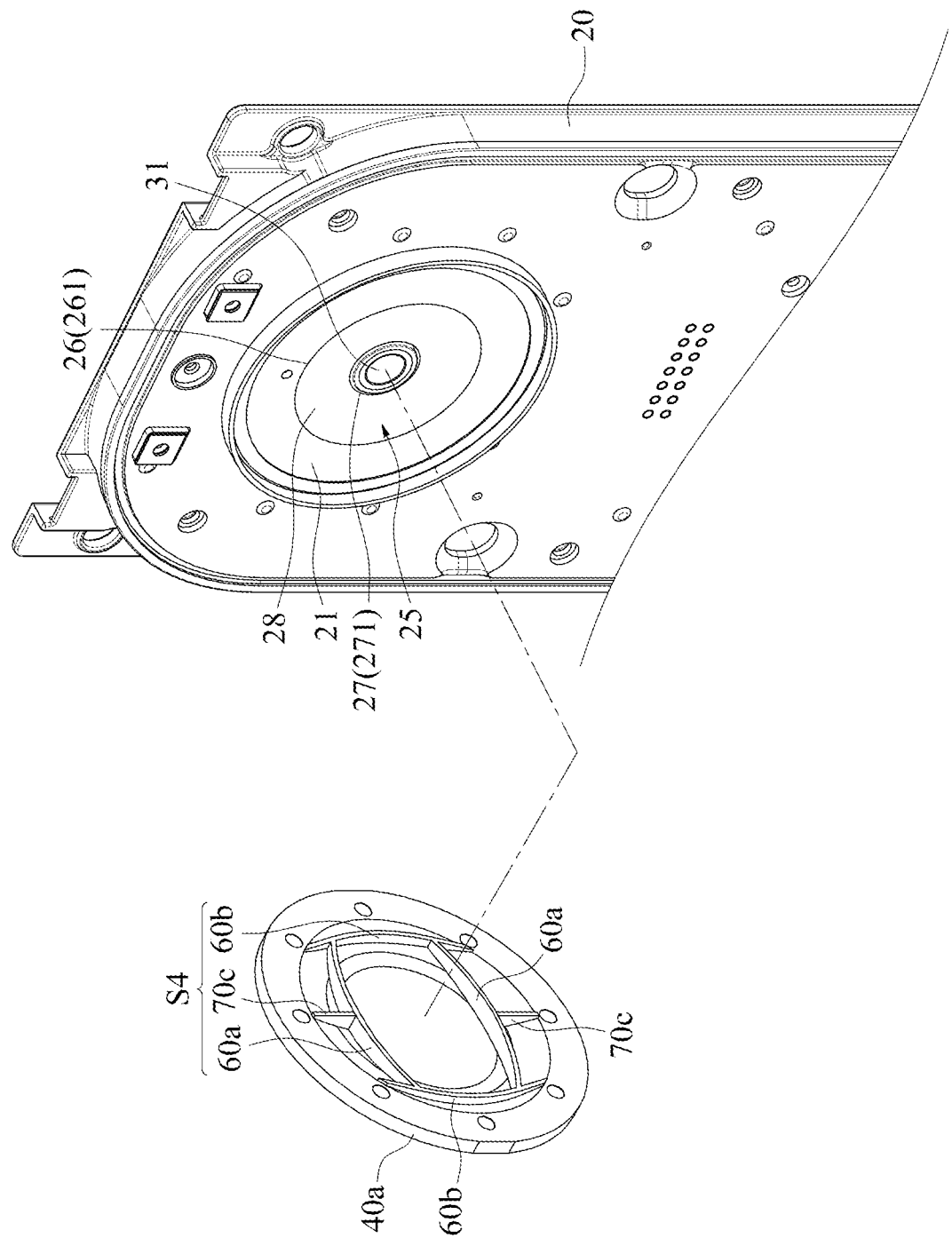
FIG. 8 illustrates an exploded view of a camera device according to a fourth embodiment of the instant disclosure.
Figure 9:
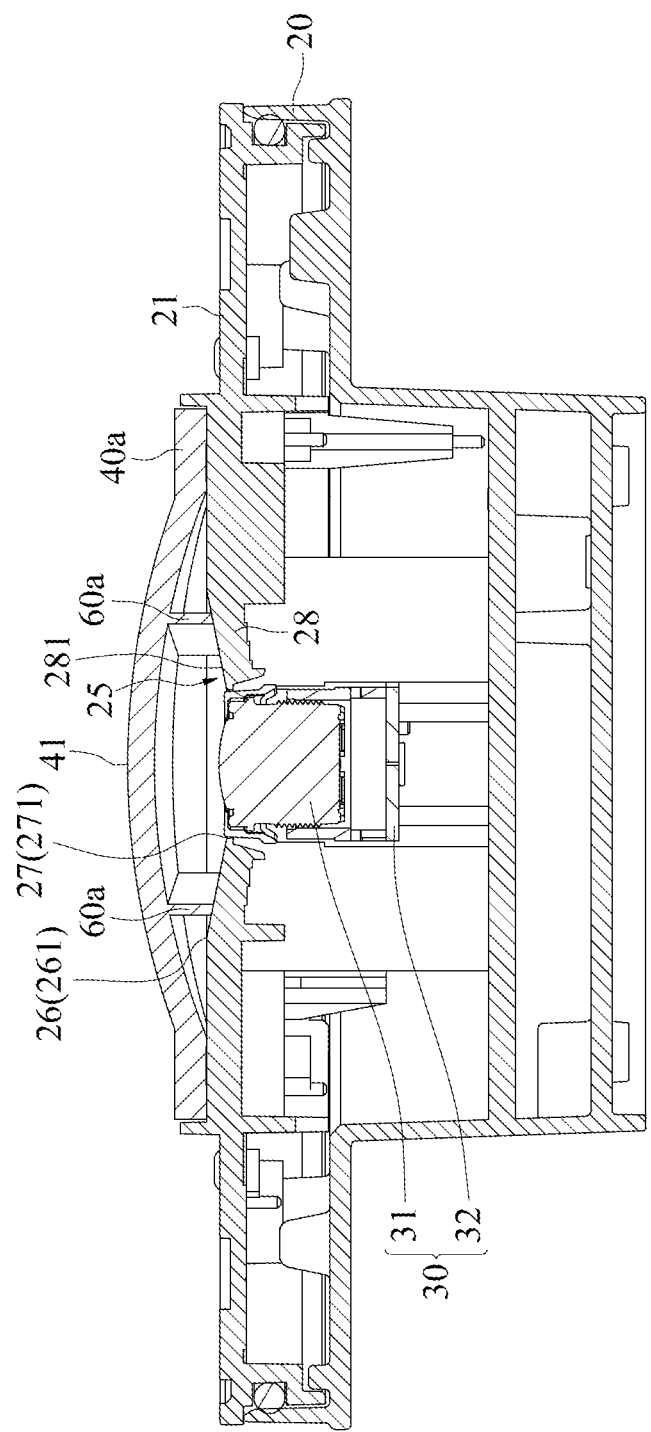
FIG. 9 illustrates a cross-sectional view of the camera device of the fourth embodiment of the instant disclosure.

FIG. 8 illustrates an exploded view of a camera device according to a fourth embodiment of the instant disclosure, and FIG. 9 illustrates a cross-sectional view of the camera device of the fourth embodiment of the instant disclosure. As shown in FIG. 8 and FIG. 9, the difference between this embodiment and the first embodiment shown in FIG. 2 and FIG. 4 is at least that the shape and the position of the stopping member. Specifically, in this embodiment, the inner side protruding ribs 60a, 60b of the stopping member S4 are integrally connected to the light-transmitting cover plate 40a, rather than being connected to the conical connection wall 28. Therefore, the structural strength of the light-transmitting cover plate 40a can be enhanced and the light-transmitting cover plate 40a is not deformed easily. In this embodiment, the inner side protruding ribs 60a, 60b may be connected with each other to form a frame structure, the inner side protruding ribs 60a, 60b integrally extend from the protrusion 41 of the light-transmitting cover plate 40a, and the inner side protruding ribs 60a, 60b extend toward the shell plate 21. Moreover, in this embodiment, the end portion of each of the inner side protruding ribs 60a, 60b leans against the wall surface 281 of the conical connection wall 28 to provide a better supporting effect, thereby preventing the deformation of the light-transmitting cover plate 40a upon the light-transmitting cover plate 40a is subjected to a force. In other embodiments, a small gap (for example, a tolerance gap) may be between the end portion of each of the inner side protruding ribs 60a/60b and the wall surface 281 of the conical connection wall 28. Therefore, when the light-transmitting cover plate 40a is subjected to a force, the inner side protruding ribs 60a, 60b can still support the light-transmitting cover plate 40a instantly.

Further, as shown in FIG. 8 and FIG. 9, in this embodiment, as compared with the second periphery 271, the inner side protruding robs 60a, 60b are nearer to the first periphery 261 of the outer opening 26. In other words, in this embodiment, the distance between the inner side protruding ribs 60a, 60b and the first periphery 261 is less than the distance between the inner side protruding ribs 60a, 60b and the second periphery 271. Therefore, the transmission of the external light to the camera lens 31 can be prevented from being blocked by inner side protruding ribs 60a, 60b. Moreover, in this embodiment, likewise, the stopping member S4 comprises a plurality of radial protruding ribs 70c, one side of each of the radial protruding ribs 70c is connected to the inner side protruding rib 60a, and the radial protruding ribs 70c and the light-transmitting cover plate 40a can be integrally formed as a one-piece structure.

Therefore, the overall structural strength of the stopping member S4 can be enhanced through the radial protruding rib 70c, so that the deformation of each of the stopping member S4 can be prevented upon the stopping member S4 is subjected to a force, thus allowing the stopping member S4 providing a better supporting effect.

Figure 10:
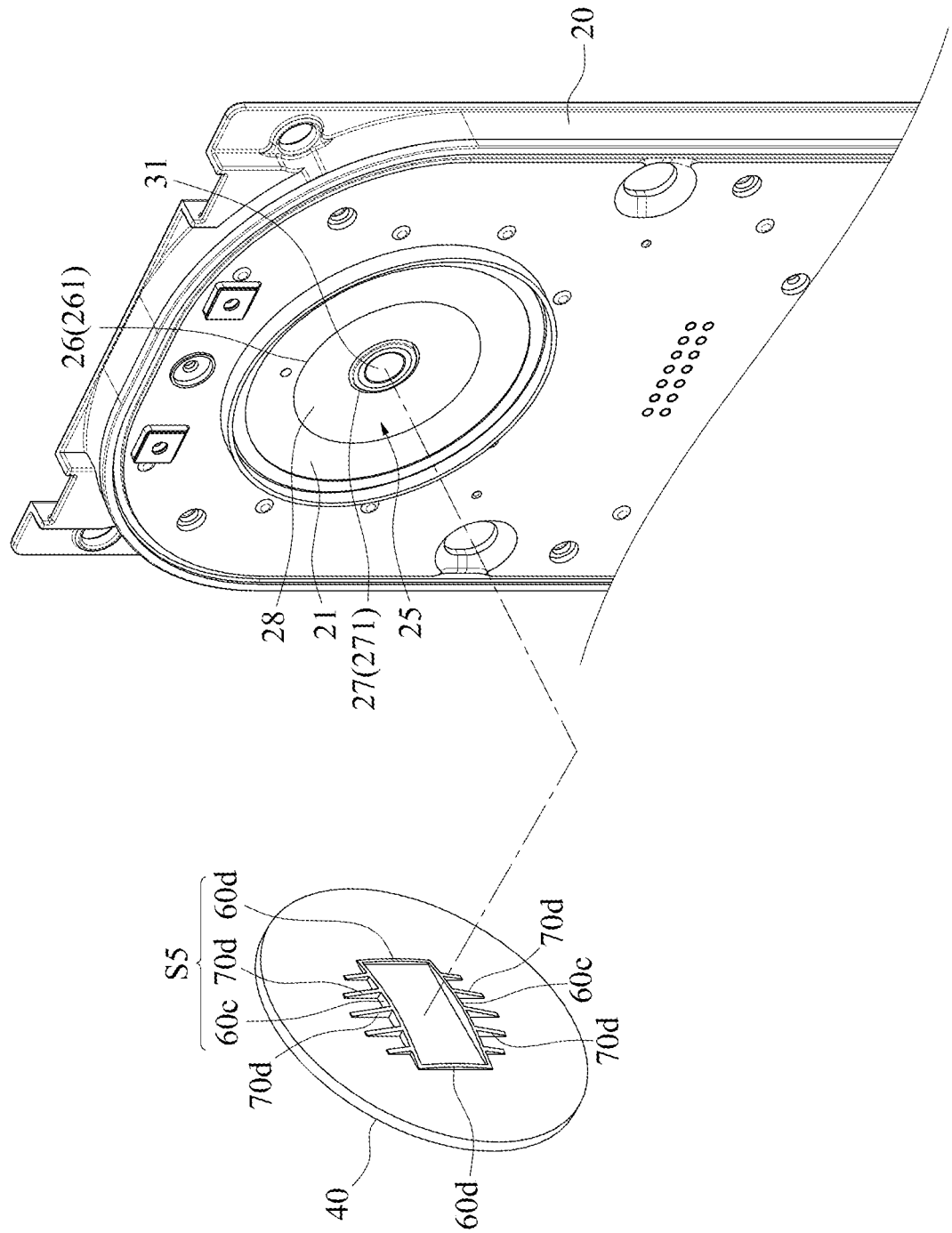
FIG. 10 illustrates an exploded view of a camera device according to a fifth embodiment of the instant disclosure.
Figure 11:
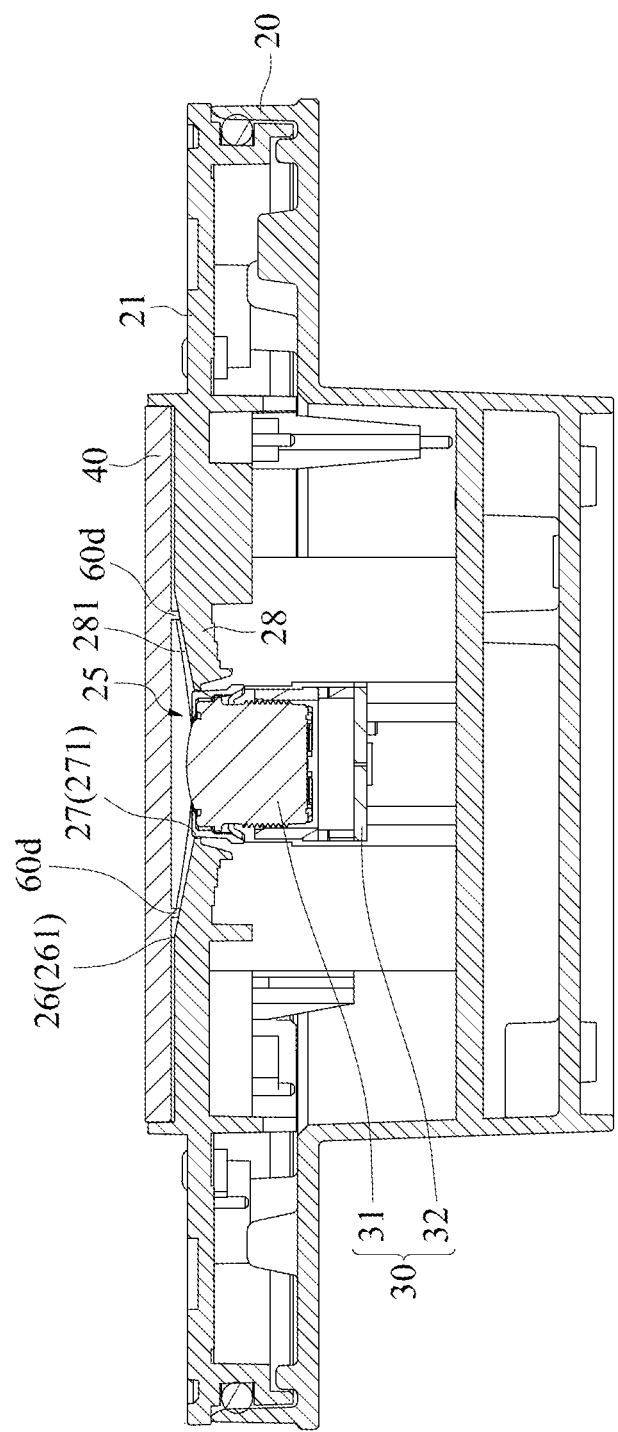
FIG. 11 illustrates a cross-sectional view of the camera device of the fifth embodiment of the instant disclosure.

FIG. 10 illustrates an exploded view of a camera device according to a fifth embodiment of the instant disclosure. FIG. 11 illustrates a cross-sectional view of the camera device of the fifth embodiment of the instant disclosure. As shown in FIG. 10 and FIG. 11, the same between this embodiment and the fourth embodiment shown in FIG. 8 and FIG. 9 is that, in this embodiment, likewise, the inner side protruding ribs 60c, 60d of the stopping member S5 are integrally connected to the light-transmitting cover plate 40, and the inner side protruding ribs 60c, 60d are connected with each other to form a frame structure, and the inner side protruding ribs 60c, 60d extend toward the shell plate 21 to lean against the wall surface 281 of the conical connection wall 28. Moreover, in this embodiment, likewise, the stopping member S5 comprises a plurality of radial protruding ribs 70d, one side of each of the radial protruding ribs 70d is connected to the inner side protruding rib 60c, and the radial protruding ribs 70d and the light-transmitting cover plate 40 can be integrally formed as a one-piece structure.

As shown in FIG. 10 and FIG. 11, the difference between this embodiment and the fourth embodiment shown in FIG. 8 and FIG. 9 is at least that, in this embodiment, the light-transmitting cover plate 40 is a flat plate and does not have the protrusion, and each of the inner side protruding ribs 60c, 60d integrally extends from the surface of the light-transmitting cover plate 40 facing the shell plate 21.

Figure 12:
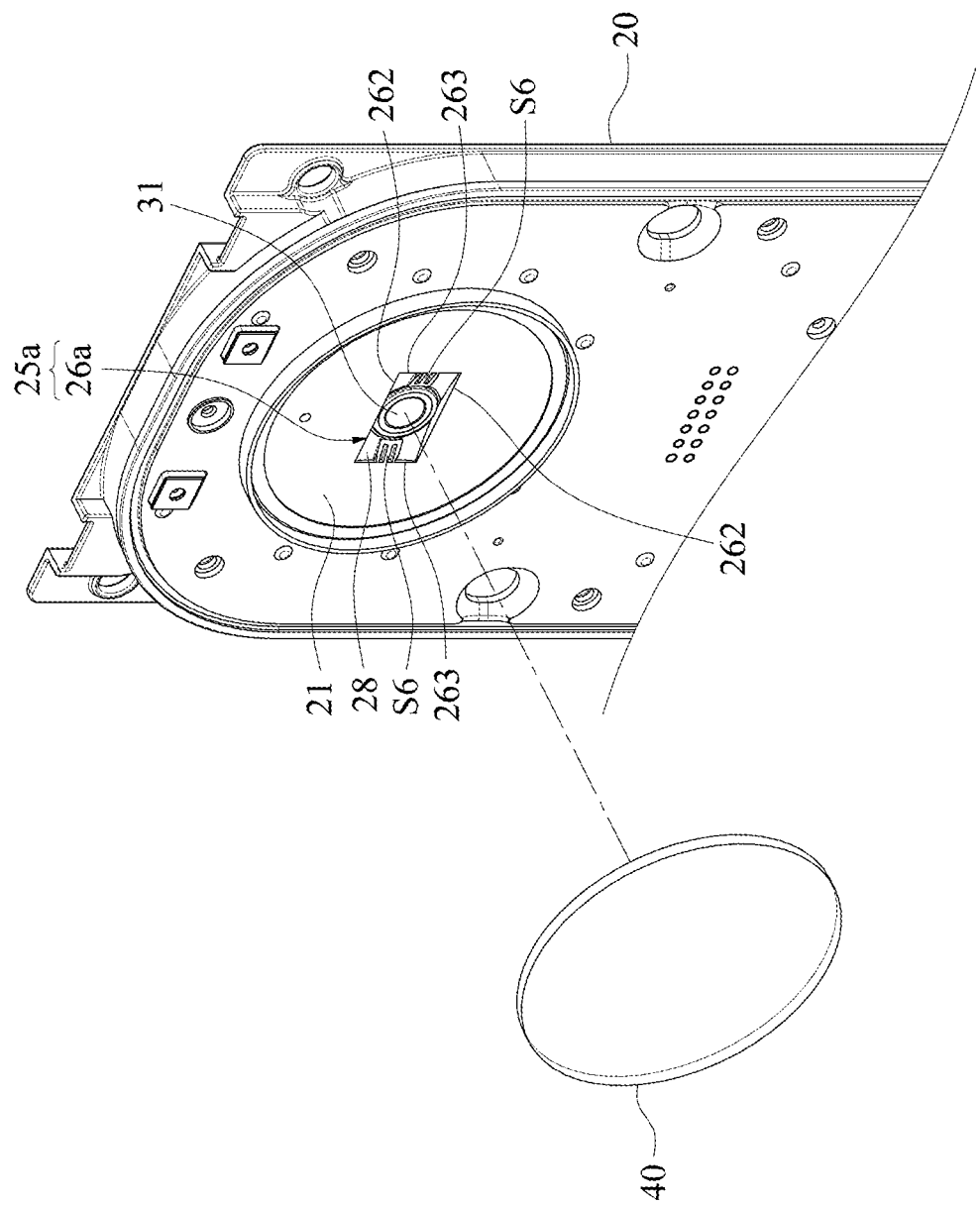
FIG. 12 illustrates an exploded view of a camera device according to a sixth embodiment of the instant disclosure.
Figure 13:
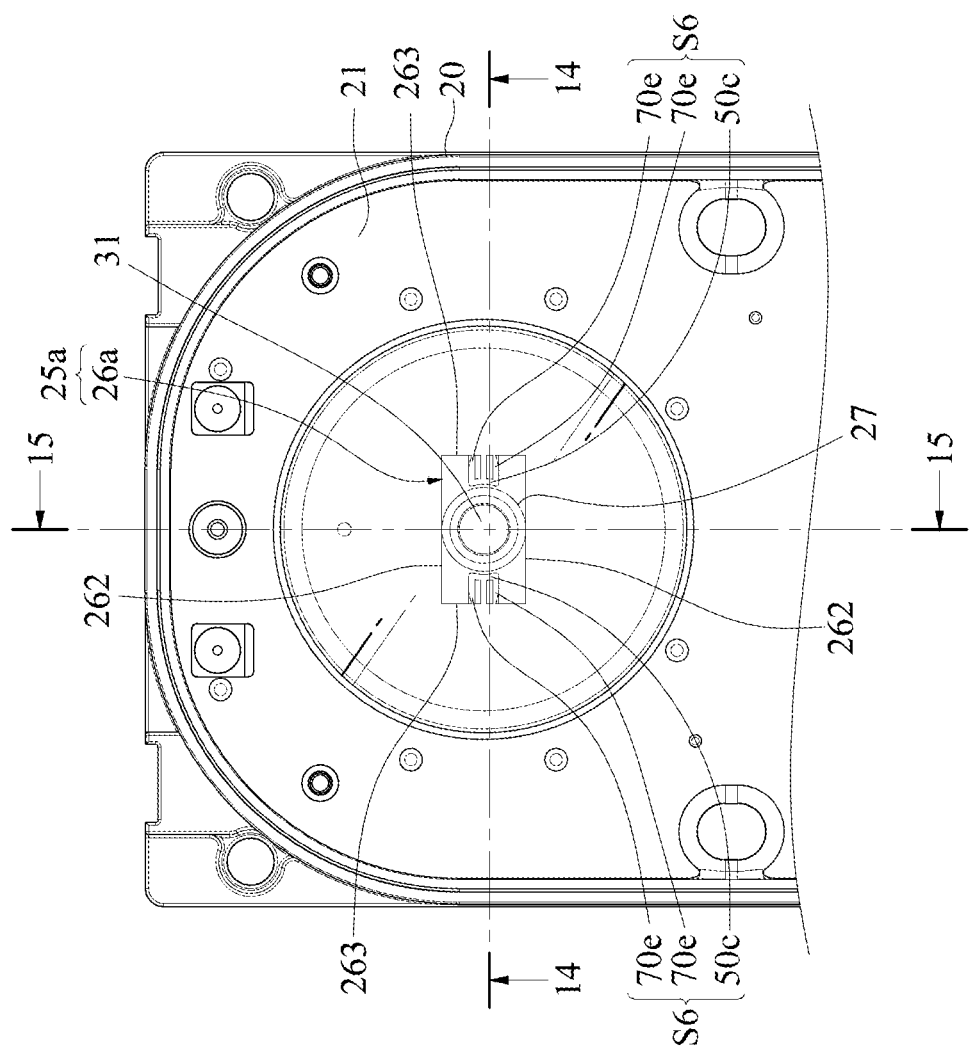
FIG. 13 illustrates a plan view of the camera device of the sixth embodiment of the instant disclosure.
Figure 14:
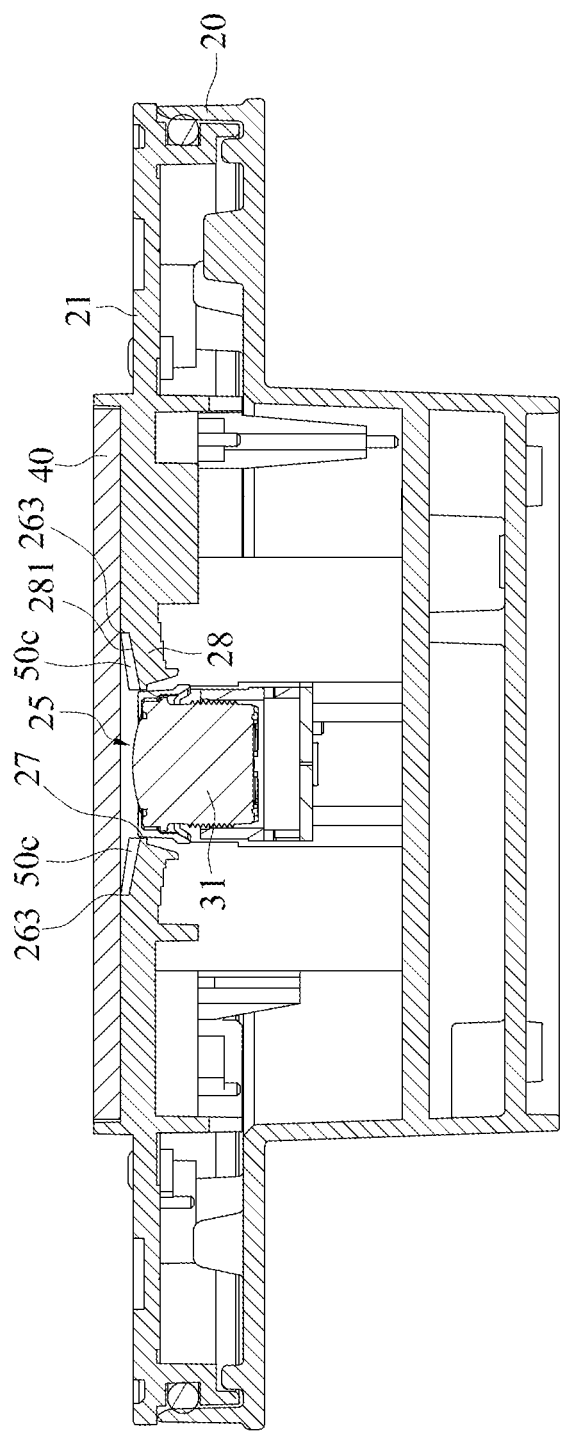
FIG. 14 illustrates a cross-sectional view along line 14-14 shown in FIG. 13.
Figure 15:
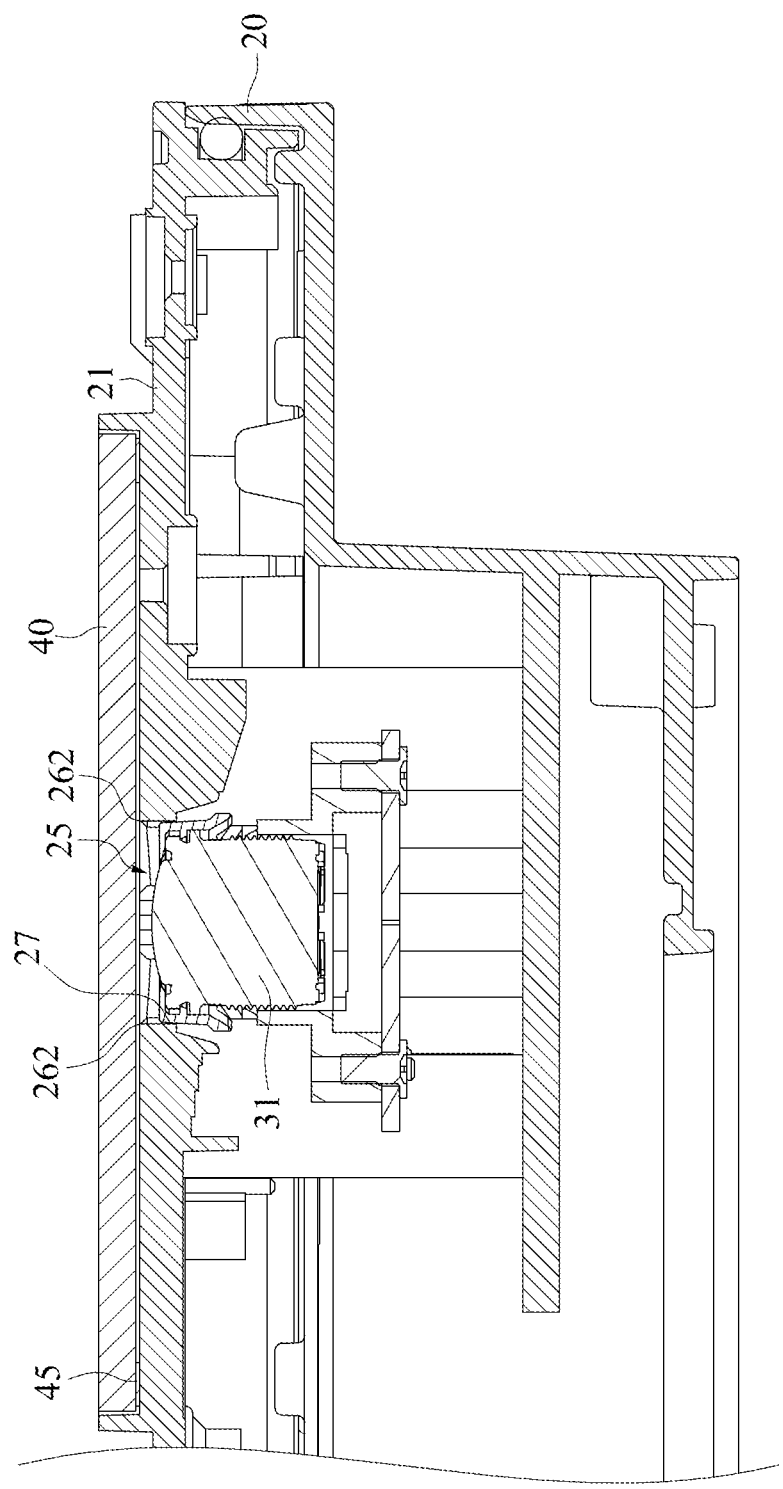
FIG. 15 illustrates a cross-sectional view along line 15-15 shown in FIG. 13.

FIG. 12 illustrates an exploded view of a camera device according to a sixth embodiment of the instant disclosure. FIG. 13 illustrates a plan view of the camera device of the sixth embodiment of the instant disclosure. FIG. 14 illustrates a cross-sectional view along line 14-14 shown in FIG. 13. FIG. 15 illustrates a cross-sectional view along line 15-15 shown in FIG. 13. As shown in FIG. 12 to FIG. 15, the difference between this embodiment and the first embodiment shown in FIG. 2 to FIG. 5 is at least that the shape of the groove. Specifically, comparing the groove 25a of this embodiment and the groove 25 of the first embodiment, in this embodiment, the outer opening 26a of the groove 25a is a rectangular opening, rather than a round opening. Therefore, the outer opening 26a has two long sides 262 and two short sides 263, and a central position of the outer opening 26a corresponds to a central position of the inner opening 27. Consequently, because the outer opening 26a of the groove 25a of this embodiment is a rectangular opening, as compared with the groove 25 of the first embodiment, in this embodiment, the two long sides 262 of the outer opening 26a can be arranged much closer to the central region of the camera lens 31 and the light-transmitting cover plate 40, thereby further preventing the deformation of the light-transmitting cover plate 40 upon the light-transmitting cover plate 40 is subjected to a force.

Furthermore, as shown in FIG. 13 and FIG. 15, in this embodiment, a length of each of the short sides 263 of the outer opening 26a is equal to an inner diameter of the inner opening 27, so that the two long sides 262 of the outer opening 26a can be arranged close to the central region of the camera lens 31 and the light-transmitting cover plate 40 as much as possible, thus allowing the two long sides 262 supporting the light-transmitting cover plate 40, thereby greatly reducing the possibility of the deformation of the light-transmitting cover plate 40 upon the light-transmitting cover plate 40 is subjected to a force.

Moreover, as shown in FIG. 12 to FIG. 15, in this embodiment, likewise, a plurality of stopping members S6 is arranged between the wall surface 281 of the conical connection wall 28 and the light-transmitting cover plate 40. Each of the stopping members S6 comprises an inner side protruding rib 50c and a plurality of radial protruding ribs 70e. In this embodiment, the number of the radial protruding ribs 70e is three and the three radial protruding ribs 70e are arranged in parallel. Each of the radial protruding ribs 70e is connected between the inner side protruding rib 50c and the short side 263, and the inner side protruding rib 50c and each of the radial protruding ribs 70e extend toward the light-transmitting cover plate 40 from the wall surface 281 of the conical connection wall 28, thereby preventing the light-transmitting cover plate 40 from contacting or impacting the camera lens 31 upon the light-transmitting cover plate 40 is subjected to a force.

In some embodiments, a separation member 45 is between the light-transmitting cover plate 40 and the shell plate 21 of the foregoing embodiments. For example, the separation member 45 may be a ring-shaped plate and fixed around the light-transmitting cover plate 40 (as shown in FIG. 2, FIG. 4, FIG. 5, and FIG. 15), so that the distance between the light-transmitting cover plate 40 and the groove 25 can be increased, thereby further reducing the possibility of the camera lens 31 contacted or impacted by the light-transmitting cover plate 40. In some embodiments, the separation member 45 may be a ring-shaped adhesive layer, so that the separation member 45 can also fixed the light-transmitting cover plate 40 on the surface of the shell plate 21.

As above, according to the camera device of one or some embodiments of the instant disclosure, the stopping member is arranged between the wall surface of the conical connection wall and the light-transmitting cover plate. Therefore, when the light-transmitting cover plate is subjected to a force (for example, when the light-transmitting cover plate is impacted or squeezed by an external force), the stopping member can achieve the function of supporting the light-transmitting cover plate to prevent the deformation of the light-transmitting cover plate or to greatly reduce the deformation extent of the light-transmitting cover plate, thereby effectively preventing the light-transmitting cover plate from contacting or impacting the camera lens in the groove.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A camera device comprising:
   a housing comprising a shell plate, wherein the shell plate has a groove, a cross-section of the groove comprises an outer opening, an inner opening, and a conical connection wall, a size of the outer opening is greater than a size of the inner opening, and the conical connection wall is connected between the outer opening and the inner opening;
   a camera module disposed inside the housing, wherein camera module comprises a camera lens, and the camera lens is in the inner opening; and
   a light-transmitting cover plate disposed on a surface of the shell plate and covering the outer opening of the groove;
   wherein the conical connection wall of the groove has a wall surface facing the light-transmitting cover plate, and a stopping member is between the wall surface and the light-transmitting cover plate;
   wherein the outer opening has a first periphery, the inner opening has a second periphery, and the stopping member is between the first periphery and the second periphery; the stopping member comprises an inner side protruding rib, and the inner side protruding rib is adjacent to the second periphery of the inner opening.

2. The camera device according to claim 1, wherein the stopping member is integrally connected to the conical connection wall.

3. The camera device according to claim 2, wherein the stopping member leans against the light-transmitting cover plate.

4. The camera device according to claim 2, wherein the stopping member has a first end and a second end opposite to the first end, the first end is adjacent to the light-transmitting cover plate, and the second end extends into the housing.

5. The camera device according to claim 4, wherein the first end has an inclination surface.

6. The camera device according to claim 4, wherein a fixation member is in the housing, and the second end of the stopping member leans against the fixation member.

7. The camera device according to claim 1, wherein the stopping member is integrally connected to the light-transmitting cover plate.

8. The camera device according to claim 7, wherein the stopping member leans against the wall surface of the conical connection wall.

9. The camera device according to claim 1, wherein the number of the stopping member is plural, and the stopping members are respectively at two opposite sides of the second periphery.

10. The camera device according to claim 1, wherein the number of the stopping member is plural, and the stopping members surround the second periphery of the inner opening.

11. The camera device according to claim 1, wherein the outer opening is a rectangular opening, and a central position of the outer opening corresponds to a central position of the inner opening.

12. The camera device according to claim 11, wherein the outer opening has two short sides opposite to each other, and a length of each of the two short sides is equal to an inner diameter of the inner opening.

13. The camera device according to claim 1, wherein a separation member is further provided between the light-transmitting cover plate and the shell plate.

14. A camera device comprising:
   a housing comprising a shell plate, wherein the shell plate has a groove, a cross-section of the groove comprises an outer opening, an inner opening, and a conical connection wall, a size of the outer opening is greater than a size of the inner opening, and the conical connection wall is connected between the outer opening and the inner opening;
   a camera module disposed inside the housing, wherein camera module comprises a camera lens, and the camera lens is in the inner opening; and a light-transmitting cover plate disposed on a surface of the shell plate and covering the outer opening of the groove;

wherein the conical connection wall of the groove has a wall surface facing the light-transmitting cover plate, and a stopping member is between the wall surface and the light-transmitting cover plate;

wherein the light-transmitting cover plate has a protrusion, the protrusion protrudes toward a direction away from the housing, and a position of the protrusion corresponds to a position of the groove.

15. A camera device comprising:

a housing comprising a shell plate, wherein the shell plate has a groove, a cross-section of the groove comprises an outer opening, an inner opening, and a conical connection wall, a size of the outer opening is greater than a size of the inner opening, and the conical connection wall is connected between the outer opening and the inner opening;

a camera module disposed inside the housing, wherein camera module comprises a camera lens, and the camera lens is in the inner opening; and a light-transmitting cover plate disposed on a surface of the shell plate and covering the outer opening of the groove;

wherein the conical connection wall of the groove has a wall surface facing the light-transmitting cover plate, and a stopping member is between the wall surface and the light-transmitting cover plate;

wherein the outer opening has a first periphery, and the inner opening has a second periphery; the stopping member comprises a radial protruding rib, one of two sides of the radial protruding rib is adjacent to the first periphery, and the other side of the radial protruding rib is adjacent to the second periphery.

16. The camera device according to claim 15, wherein the stopping member comprises an inner side protruding rib, the inner side protruding rib is adjacent to the second periphery of the inner opening, and the radial protruding rib is connected to the inner side protruding rib.

* * * * *